(12) United States Patent
Baligh et al.

(10) Patent No.: US 9,621,239 B2
(45) Date of Patent: Apr. 11, 2017

(54) SYSTEM AND METHOD FOR NONLINEAR MU-MIMO DOWNLINK CHANNEL PRECODING WITH ARBITRARY PRECODER

(71) Applicant: Huawei Technologies Co., Ltd., Shenzhen (CN)

(72) Inventors: Mohammadhadi Baligh, Kanata (CA); Hamidreza Farmanbar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 13/852,811

(22) Filed: Mar. 28, 2013

(65) Prior Publication Data

US 2013/0259156 A1    Oct. 3, 2013

Related U.S. Application Data

(60) Provisional application No. 61/616,694, filed on Mar. 28, 2012.

(51) Int. Cl.
*H04L 25/03* (2006.01)
*H04B 7/0456* (2017.01)
*H04B 7/0452* (2017.01)

(52) U.S. Cl.
CPC ..... *H04B 7/0456* (2013.01); *H04L 25/03949* (2013.01); *H04B 7/0452* (2013.01)

(58) Field of Classification Search
CPC ....... H04L 25/03343; H04L 2025/0349; H04L 1/0041; H04L 25/03146; H04B 7/0452; H04B 7/0456; H04B 7/0426; H04B 2201/709709; H04W 52/346; H04J 11/0033

USPC ........ 375/232, 296, 233, 350, 285, 146, 346
See application file for complete search history.

(56) References Cited

U.S. PATENT DOCUMENTS

| | | | |
|---|---|---|---|
| 2006/0203777 A1* | 9/2006 | Kim et al. | 370/334 |
| 2006/0276918 A1 | 12/2006 | Cioffi et al. | |
| 2008/0207238 A1 | 8/2008 | Tosato | |
| 2010/0246715 A1* | 9/2010 | Dao | H04J 11/0033 375/296 |
| 2011/0058598 A1* | 3/2011 | Gaur | 375/233 |
| 2011/0058599 A1 | 3/2011 | Gaur | |
| 2011/0176642 A1* | 7/2011 | Milliner et al. | 375/340 |
| 2011/0205929 A1* | 8/2011 | Quek et al. | 370/252 |
| 2011/0243007 A1 | 10/2011 | Xiao | |
| 2012/0064846 A1* | 3/2012 | Yokomakura et al. | 455/101 |

(Continued)

FOREIGN PATENT DOCUMENTS

| | | |
|---|---|---|
| CN | 101552633 A | 10/2009 |
| CN | 102577154 A | 7/2012 |

OTHER PUBLICATIONS

Dietrich, et al., "Robust Tomlinson-Harashima Precoding for the Wireless Broadcast Channel," IEEE Transactions on Signal Processing, vol. 55, No. 2, Feb. 2007 pp. 631-644.*

(Continued)

*Primary Examiner* — Leila Malek
(74) *Attorney, Agent, or Firm* — Slater Matsil, LLP (57) ABSTRACT

Method and apparatus are provided for transmission of data. A precoder is selected, and a feedforward filter is derived in accordance with the precoder. In some embodiments, the precoder is an arbitrary effective precoder. Data prepared using the precoder and the feedforward filter can then be transmitted.

25 Claims, 7 Drawing Sheets

(56) References Cited

U.S. PATENT DOCUMENTS

2013/0142290 A1 6/2013 Farmanbar et al.
2014/0029522 A1 1/2014 Farmanbar et al.

OTHER PUBLICATIONS

Fincke, U., et al., "Improved Methods for Calculating Vectors of Short Length in a Lattice, Including a Complexity Analysis," Mathematics of Computation, vol. 44, No. 170, Apr. 1985, pp. 463-471.

Tu, Z., et al., "Multiuser Diversity for a Dirty Paper Approach," IEEE Communications Letters, vol. 7, No. 8, Aug. 2003, pp. 370-372.

Hochwald, B. M., et al., "A Vector-Perturbation Technique for Near-Capacity Multiantenna Multiuser Communication—Part II: Peturbation," IEEE Transactions on Communications, vol. 53, No. 3, Mar. 2005, pp. 537-544.

Palomar D. P., et al., "A Tutorial on Decomposition Methods for Network Utility Maximization," IEEE Journal on Selected Areas in Communications, vol. 24, No. 8, Aug. 2005, pp. 1439-1451.

Weingarten, H., et al., "The Capacity Region of the Gaussian Multiple-Input Multiple-Output Broadcast Channel," IEEE Transactions on Information Theory, vol. 52, No. 9, Sep. 2006, pp. 3936-3964.

Schmidt, D. A., et al., "Minimum mean square error vector precoding," Information Theory, European Transactions on Telecommunications, Eur. Trans. Telecomuns.. 2008; 19:219-231, Mar. 13, 2007, pp. 220-231.

Liu, J., et al., "Improved Tomlinson-Harashima precoding for the downlink of multi-user MIMO systems," Can. J. Elect. Comput. Eng., vol. 32, No. 3, Summer 2007, pp. 133-144.

"$3^{rd}$ Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.0.0, Mar. 2010, 104 pages.

Vetter, H., et al., "A New Dedicated Pilot Allocation Scheme in Multiuser MIMO OFDM With Vector Perturbation," Toshiba Research Europe Ltd., Telecommunications Research Laboratory, 2011 IEEE, 5 pages.

International Search Report and Written Opinion of Patent Cooperation Treaty (PCT), International Application No. PCT/US13/34460, Applicant Huawei Technologies Co., Ltd., date of mailing Jun. 10, 2013, 8 pages.

EESR received in EP13479946, mailed Mar. 17, 2015, 8 pages.

Windpassinger, et al., "Precoding in Multiantenna and Multiuser Communications," IEEE Transactions on Wireless Communications, IEEE Service Center Piscataway, NJ, US, vol. 3, No. 4, Jul. 2004, pp. 1305-1316.

Chinese Office Action received in Application No. 201380015157.5 mailed Dec. 16, 2015, 5 pages.

Bohnke, et al., "Weighted Sum Rate Maximization for the MIMO-Downlink Using a Projected Conjugate Gradient Algorithm," Cross Layer Design, 2007, International Workshop On, IEEE, Sep. 1, 2007, 4 pages.

\* cited by examiner

SYSTEM AND METHOD FOR NONLINEAR MU-MIMO DOWNLINK CHANNEL PRECODING WITH ARBITRARY PRECODER

This application claims the benefit of U.S. Provisional Application No. 61/616,694, filed on Mar. 28, 2012, entitled "System and Method for Nonlinear MU-MIMO Downlink Channel Precoding with Arbitrary Precoder," which application is hereby incorporated herein by reference.

TECHNICAL FIELD

The present disclosure relates generally to digital communications, and more particularly to a system and method for nonlinear MU-MIMO downlink channel precoding with arbitrary precoder.

BACKGROUND

The capacity region of a multiple-input multiple-output broadcast channel (MIMO-BC), also known as a downlink multi-user MIMO (DL MU-MIMO) channel, generally is achievable by dirty paper coding (DPC). However, DPC generally is too complex for implementation. Lower-complexity nonlinear precoding techniques for DL MU-MIMO channel offer performance improvement over linear precoding techniques.

SUMMARY OF THE DISCLOSURE

Example embodiments of the present disclosure which provide a system and method for nonlinear MU-MIMO downlink channel precoding with arbitrary precoder.

In accordance with an example embodiment of the present disclosure, a method for transmitting data to a plurality of users is provided. The method includes selecting, by a transmitting device, a precoder, wherein the precoder is an arbitrary effective precoder, and deriving, by the transmitting device, a feedforward filter in accordance with the precoder. The method may also include preparing, by the transmitting device, the data using the precoder and the feedforward filter, and transmitting, by the transmitting device, the prepared data.

In accordance with another example embodiment of the present disclosure, a method for transmitting data to a plurality of users is provided. The method includes selecting, by a transmitting device, a precoder having a per layer power allocation for the plurality of users, and deriving, by the transmitting device, a feedforward filter in accordance with the precoder. The method also includes adjusting, by the transmitting device, precoded transmissions to the plurality of users using the feedforward filter, and transmitting, by the transmitting device, the adjusted precoded transmissions.

In accordance with another example embodiment of the present disclosure, a transmitting device is provided. The transmitting device includes a processor and a transmitter operatively coupled to the processor. The processor selects a precoder, derives a feedforward filter in accordance with the precoder, where the precoder is an arbitrary effective precoder. The processor also prepares data using the precoder and the feedforward filter. The transmitter transmits the prepared data.

One advantage of an embodiment is that an arbitrary precoder may be used, which can allow for greater freedom to improve performance.

A further advantage of an embodiment is that the techniques presented herein are less computationally intensive, which enable the use of less powerful processors that are generally less expensive and have lower power requirements to provide computational services.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to nonlinear MU-MIMO downlink channel precoding with arbitrary precoder. For example, at a transmitting device, the transmitting device selects a precoder, where the precoder is an arbitrary effective precoder. The transmitting device also derives a feedforward filter in accordance with the precoder, prepares the data using the precoder and the feedforward filter, and transmits the prepared data. As another example, at a transmitting device, the transmitting device selects a precoder having a per layer power allocation for the plurality of users, derives a feedforward filter in accordance with the precoder, adjusts precoded transmissions to the plurality of users using the feedforward filter, and transmits the adjusted precoded transmissions.

The present disclosure will be described with respect to example embodiments in a specific context, namely a communications system that supports DL MU-MIMO. The communications system may be standards compliant, such as those that are compliant to 3GPP LTE, WiMAX, IEEE 802.11, and the like, or non-standards compliant.

Figure 1:
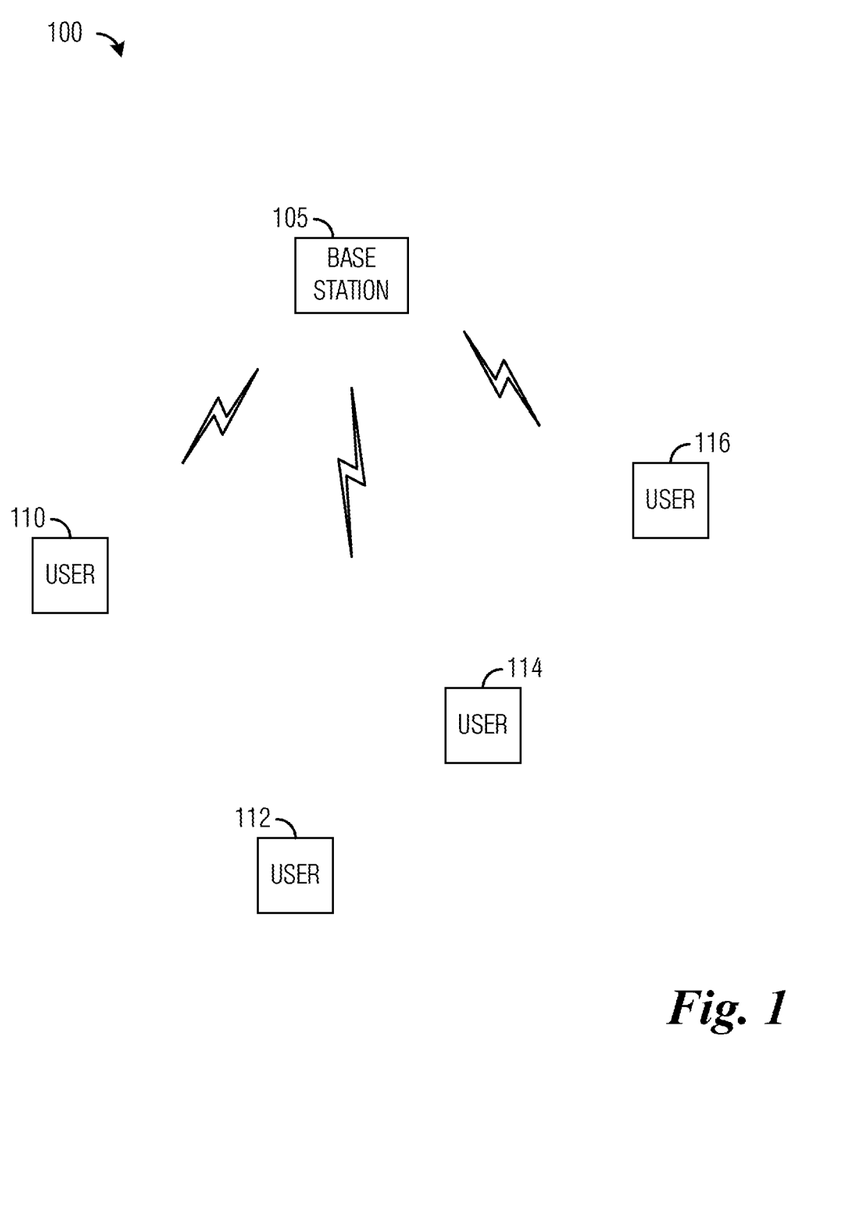
FIG. 1 illustrates an example communications system according to example embodiments described herein.

FIG. 1 illustrates a communications system 100. Communications system 100 includes a base station 105. Base station 105 may serve one or more users, such as users 110-116. A base station may also be commonly referred to as a controller, communications controller, NodeB, evolved NodeB, and the like, while a user may also be commonly referred to as a mobile, mobile station, subscriber, terminal, user equipment, and the like. While it is understood that communications systems may employ multiple base stations capable of communicating with a number of users, only one base station and four users are illustrated for simplicity.

In DL MU-MIMO, base station 105 may transmit to two or more users. As an example, base station 105 may transmit to a first user with one or more first transmit antenna of its transmit antenna array and to a second user with one or more second transmit antenna of its transmit antenna array. Base station 105 may utilize a precoder to adjust its transmissions and its transmit antenna array. As an example, the precoder may be used to beamform transmissions to the two users.

As discussed previously, nonlinear precoding techniques may offer performance improvement over linear precoding techniques. Examples of nonlinear precoding techniques include Tomlinson-Harashima Precoding (THP), vector perturbation (VP), and the like. THP and VP have lower computational complexity then DPC, and therefore, may be viable candidates for precoder design at a base station, such as base station 205.

In VP, a linear precoder is used to transmit the signal of the users. However, the vector containing users' signals is perturbed prior to linear precoding to minimize instantaneous transmit power. THP can be formulized as VP. In other words, in VP and THP as well, the vector containing the users' signals is perturbed and then an effective linear precoder is applied. The idea behind THP and VP is to decrease the average transmit power while maintaining the same signal to noise ratio (SNR) levels at the receivers as their linear counterparts which do not apply perturbation (while ignoring modulo loss at the receivers).

An arbitrary linear precoder may be used with VP, which may provide more freedom in improving performance. However, the calculation of perturbed vector to minimize transmit power requires sphere decoding algorithm, which is an NP-Hard problem. Furthermore, the calculation of perturbed vector covariance matrix may be difficult. The covariance matrix of the perturbed signals is required for the calculation of a transmit power normalization factor. A brute-force calculation of the covariance matrix involves sphere decoding for all possible user signal vectors and then averaging out over all possibilities, which may be prohibitively complex. In order to estimate the transmit power normalization factor, averaging over transmissions over some intervals has been proposed. However, the estimated power by this approach may not be accurate, thereby leading to performance degradation.

It is noted that THP is less complex than VP in terms of both precoding and perturbed signal covariance calculations. However, it generally does not lend itself to using an arbitrary linear precoder. As an example, in zero forcing (ZF) THP (ZF-THP), the power allocation on columns of the effective linear precoder is fixed and cannot be optimized.

According to an example embodiment, a variant of the THP algorithm that makes use of an arbitrary precoder is presented. As a special case, focus is given to a variant of the zero-forcing THP algorithm with arbitrary user power allocation. Also, user power allocation is optimized such that a weighted sum-rate of users is maximized. A closed-form power allocation formula in the case that high SNR approximation of Shannon capacity is used as user rates is also presented.

The following notations and operators are used herein: Boldface upper-case symbols represent a matrix (e.g., A), and boldface lower-case symbols represent a vector (e.g., a); The notation diag(A) represents a diagonal matrix made up of the diagonal elements of A; $[A]_{ij}$ denotes the i-th row and j-th column element of A; tr(.) denotes the trace of a matrix, E[.] denotes expectation, $(.)^T$ denotes transpose, $(.)^H$ denotes conjugate transpose, and $(.)^{-H}$ denotes (pseudo) inverse conjugate transpose.

Figure 2:
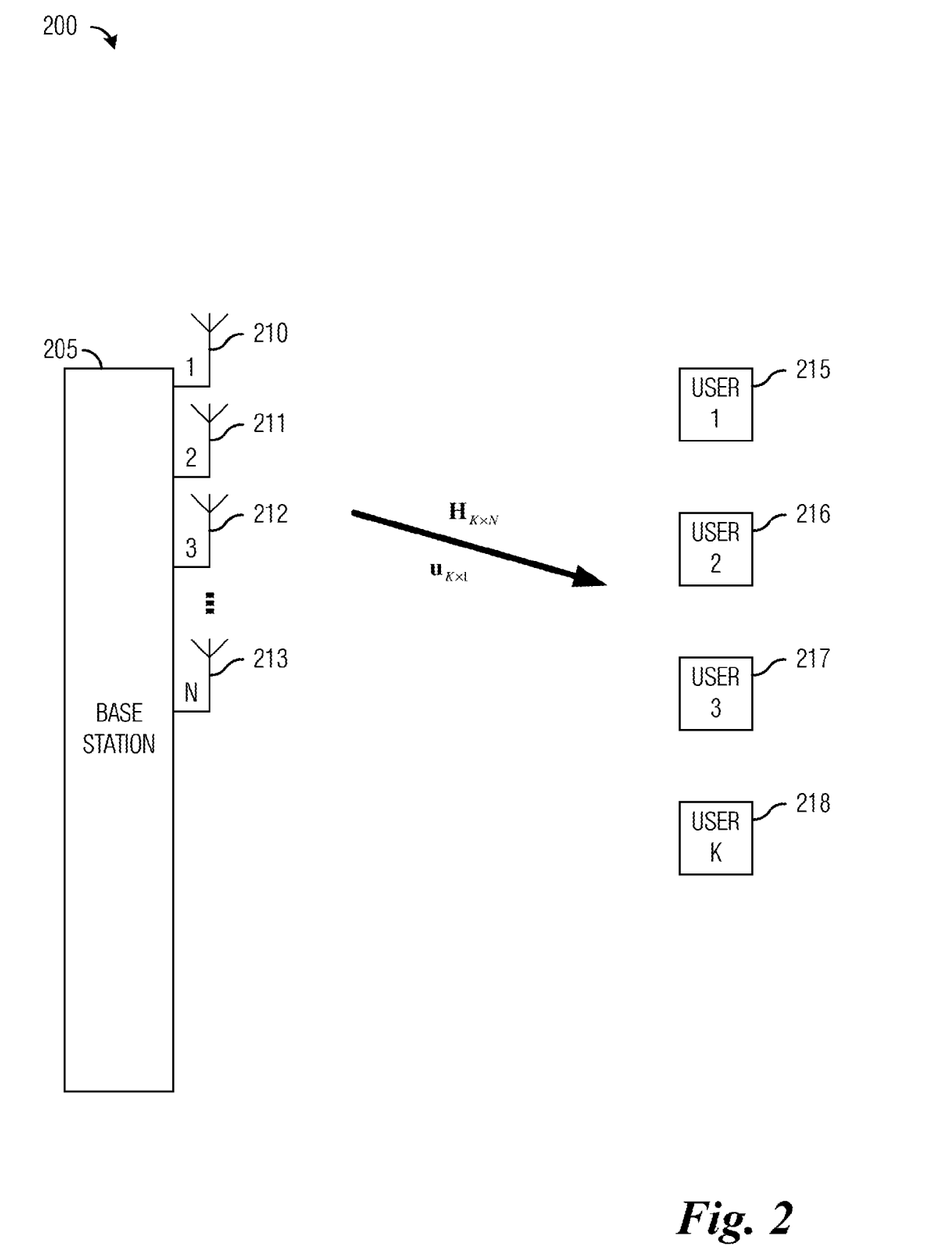
FIG. 2 illustrates an example communications system where a base station transmits to a plurality of users using DL MU-MIMO according to example embodiments described herein.

FIG. 2 illustrates a communications system 200 where a base station 205 transmits to a plurality of users using DL MU-MIMO. Base station 205 has a transmit antenna array with N (an integer value greater than or equal to two) transmit antennas, such as antennas 210-213. Base station 205 may use its transmit antenna array to transmit to up to K (an integer value less than or equal to N) users, such as users 215-218. It is noted that as used in this situation, user or users refers to actual intended recipients of a transmission from base station 205 and not users operating within communications system 200, which may be larger than K or N. A MU-MIMO channel $H_{K \times N}$ is the channel from base station 205 to the users and is assumed to be known by base station 205. Additionally, $u_{K \times 1}$ is the vector of users' signals chosen from a unit power constellation.

In VP, the transmit signal is expressible as $$x = P\hat{u} \qquad (1)$$
$$= P(u + \tau l)$$

where $P_{N \times K}$ is a precoder matrix which is calculated based on $H_{K \times N}$, $\tau$ is the constellation width plus twice the minimum distance of the constellation, and l is a complex integer vector that minimizes the instantaneous transmit power $\|x\|^2$. The perturbed vector $\hat{u}$ takes values in an infinite extended constellation.

The covariance matrix of $\hat{u}$ by $R_{\hat{u}\hat{u}}$. $R_{\hat{u}\hat{u}}$ is a function of precoder P which in turn is a function of the MU-MIMO channel H. The average transmit power is expressible as $$E[x^H x] = E[tr(xx^H)] \qquad (2)$$
$$= E[tr(P\hat{u}\hat{u}^H P^H)]$$
$$= tr(PE[\hat{u}\hat{u}^H]P^H)$$
$$= tr(PP_{\hat{u}\hat{u}} P^H).$$

The transmit signal (Expression (1)) requires normalization such that the average transmit power is fixed at some value.

From Expression (2), the calculation of power normalization factor requires the calculation of $R_{\hat{u}\hat{u}}$, which may be prohibitively complex.

In zero-forcing VP (ZF-VP), the precoder is expressible as $$P = H^H(HH^H)^{-1}D \quad (3)$$

where $D = D_{K \times K}$ is an arbitrary diagonal matrix which can provide the flexibility of user power allocation.

In standard ZF-THP, QR decomposition is applied to $H^H$ as follows $$H^H = Q_{N \times K} R_{K \times K} \quad (4)$$

where Q has orthonormal columns and R is an upper triangular matrix with real entries on the diagonals. The first step of ZF-THP is expressible as $$v_1 = u_1 \quad (5)$$
$$v_2 = u_2 - \frac{r_{12}^*}{r_{22}} v_1 + \tau l_2$$
$$\vdots$$
$$v_K = u_K - \frac{r_{(K-1)K}^*}{r_{KK}} v_{K-1} - \ldots - \frac{r_{1K}^*}{r_{KK}} v_1 + \tau l_K$$

where $u_k$s are the elements of signal vector u and $r_{ij}$s are the elements R and $l_2, \ldots, l_K$ are complex integers chosen such that elements of the nonlinearly precoded vector v remain within the original constellation boundaries. The second step of standard THP is expressible as $$x = Qv \quad (6)$$

where x is the transmit signal.

For both VP and THP, the vector of received signals by users is expressible as $$y = Hx + z \quad (7)$$

where $z = [z_1 \ldots z_K]^T$ is the noise vector at receivers with independent elements.

The average transmit power for THP is expressible as $$E[x^H x] = E[tr(xx^H)] \quad (8)$$
$$= E[tr(Qvv^H Q^H)]$$
$$= tr(QE[vv^H]Q^H)$$
$$= tr(QR_{vv}Q^H)$$
$$\cong tr(QQ^H)$$
$$= K$$

since $R_{vv}$ can be approximated as identity matrix. From Expression (8), the normalization of transmit signal in THP is much easier than in VP.

As noted previously, THP may be reformulated as VP. Expression (5) may be rewritten as $$(\text{diag}(R))^{-1} R^H v = u + \tau l \quad (9)$$

where $l = [0, l_2, \ldots, l_K]^T$. The transmit signal for ZF-THP can be expressed as $$x = Qv \quad (10)$$
$$= QR^{-H} \text{diag}(R)(u + \tau l)$$
$$= H^H(HH^H)^{-1} \text{diag}(R)(u + \tau l)$$
$$= H^H(HH^H)^{-1} \text{diag}(R)\hat{u}.$$

Which has the form of ZF-VP with an effective linear precoder $$P_{eff} = H^H(HH^H)^{-1} \text{diag}(R). \quad (11)$$

It should be noted that in ZF-THP, the perturbation vector l is obtained from successive interference cancellation at the transmitter (see Expression (5)) and may not be the same as the optimal perturbation obtained from sphere decoding in ZF-VP.

According to an example embodiment, it is possible to modify THP (referred to herein as the modified THP algorithm) to allow the use of an arbitrary precoder, e.g., an arbitrary effective linear precoder, which may permit more flexibility in improving performance. As an example, an arbitrary precoder may allow for user level power optimization, sum-rate maximization, and the like.

If standard ZF-THP is used, the received signal at user k is expressible as $$y_k = [\text{diag}(R)]_{kk}(u_k + \tau l_k) + z_k. \quad (12)$$

It is noted that the perturbation on $u_k$ may be removed by a modulo operation at the user. The received power of user k is then expressible as $[\text{diag}(R)]_{kk}^2$. Therefore, power allocation is fixed and cannot be optimized. However, a modified THP algorithm that is operable with an arbitrary effective linear precoder is possible.

Let $B_{K \times K}$ and $F_{N \times K}$ be the THP feedback and feedforward filters, respectively, where B is a unit triangular matrix (i.e., a triangular matrix with unit elements on the main diagonal). The transmitted signal is expressible as $$x = FB^{-1}\hat{u}. \quad (13)$$

Suppose that the effective linear precoder is P, where P is an arbitrary N×K matrix for which a pseudo inverse exists. In other words, P may be decomposed as $$P = FB^{-1} \quad (14)$$

where B is unit triangular matrix. No restrictions are placed on F. Apply QR decomposition on $P^{-H} = P(P^H P)^{-1}$ as follows $$P^{-H} = Q_1 R_1. \quad (15)$$

Then, it may be chosen that $$B = R_1^H(\text{diag}(R_1))^{-1}, \quad (16)$$

and $$F = Q_1(\text{diag}(R_1))^{-1}. \quad (17)$$

Then $FB^{-1} = Q_1 R_1^{-H}$. It is sufficient to show that $P = Q_1 R_1^{-H}$. By taking pseudo inverse Hermitian of both sides of Expression (15), the following is obtained $$P = Q_1^{-H} R_1^{-H} \quad (18)$$
$$= Q_1 R_1^{-H}$$

since $Q_1^{-H} = Q_1$.

In summary, the first step of the modified THP algorithm is expressible as $$v_1 = u_1 \quad (19)$$
$$v_2 = u_2 - b_{21}v_1 + \tau l_2$$
$$\vdots$$
$$v_K = u_K - b_{K(K-1)}v_{K-1} - \ldots - b_{K1}v_1 + \tau l_K$$

where $b_{ij}$s are the elements of B shown in Expression (16) and the second step is expressible as $$x = Fv \quad (20)$$

where F is as shown in Expression (17).

Figure 3:
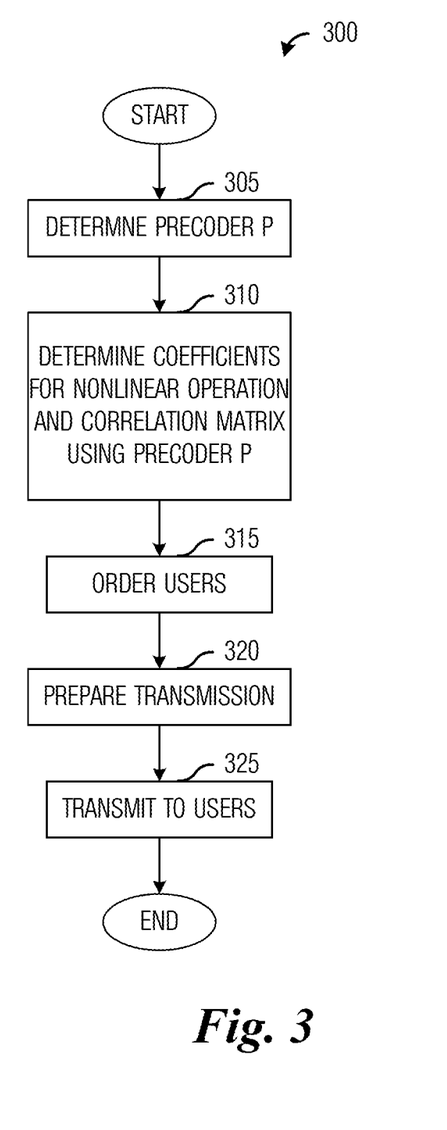
FIG. 3 illustrates an example flow diagram of operations in using DL MU-MIMO to transmit to a plurality of users according to example embodiments described herein.

FIG. 3 illustrates a flow diagram of operations 300 in using DL MU-MIMO to transmit to a plurality of users. Operations 300 may be indicative of operations occurring in a transmitting device, such as a base station, a user, and the like, as the transmitting device uses DL MU-MIMO to transmit to a plurality of users.

Operations 300 may begin with the transmitting device determining or selecting a precoder P (block 305). The transmitting device may determine, e.g., select, the precoder to meet performance requirements or expectations. As an example, the precoder may be selected to optimize user power allocation, to maximize a sum-rate of users, and the like. A detailed description of determining the precoder is provided below.

The transmitting device may determine coefficients for nonlinear operation, as well as a correlation matrix using precoder P (block 310). As an example, the transmitting device may determine a feedforward filter F and/or a feedback filter B using precoder P. As an example, the transmitting device may determine the feedforward filter F and/or the feedback filter B by determining an inverse conjugate transpose of the precoder P, utilizing QR decomposition, and computing the feedforward filter F and/or the feedback filter B. Detailed discussions of techniques for determining the feedforward filter F and/or the feedback filter B are presented below.

The transmitting device may order users (block 315). The transmitting device may order the users according to transmit power, scheduling order, and the like. The transmitting device may prepare a transmission to the users (block 320). According to an example embodiment, preparing the transmission may include precoding information to be transmitted to the users with the precoder P (i.e., to generate v from Expression (20)) and then adjusting the precoded information with the feedforward filter F (i.e., to generate x from Expression (20)). The transmitting device may transmit the filtered precoded information to the users (block 325).

Figure 4A:
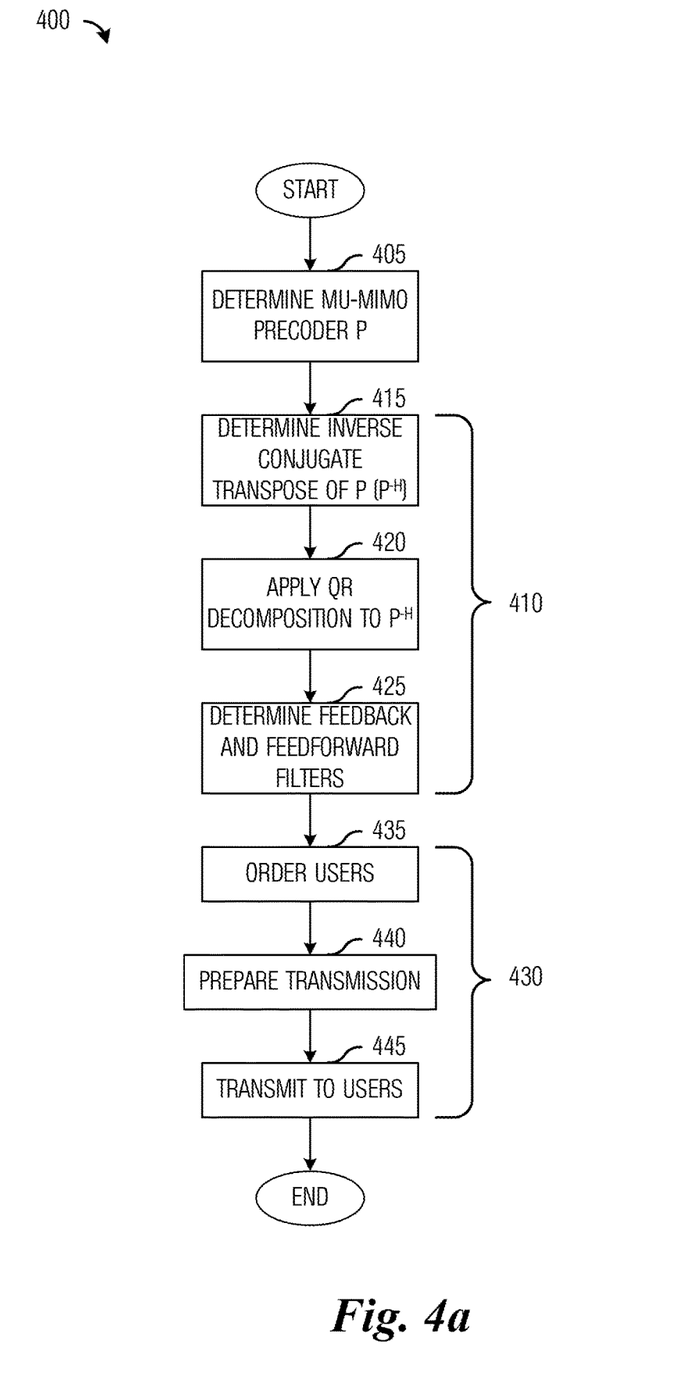
FIG. 4a illustrates an example flow diagram of operations in using DL MU-MIMO to transmit to a plurality of users utilizing a first example embodiment for determining coefficients for nonlinear operation, as well as a correlation matrix using a nonlinear precoding algorithm according to example embodiments described herein.

FIG. 4a illustrates a flow diagram of operations 400 in using DL MU-MIMO to transmit to a plurality of users utilizing a first example embodiment for determining coefficients for nonlinear operation, as well as a correlation matrix using a nonlinear precoding algorithm. Operations 400 may be indicative of operations occurring in a transmitting device, such as a base station, a user, and the like, as the transmitting device uses DL MU-MIMO to transmit to a plurality of users.

Operations 400 may begin with the transmitting device determining or selecting a MU-MIMO precoder (block 405). The precoder may be an arbitrary effective precoder. The transmitting device may determine coefficients for nonlinear operation, as well as a correlation matrix using the precoder (blocks 410). Determining the coefficients for nonlinear operation may include the transmitting device determining an inverse conjugate transpose (potentially a pseudo inverse conjugate transpose) of the precoder (block 415) expressible as $P^{-H} = P(P^H P)^{-1}$, applying QR decomposition to the inverse conjugate transpose of the precoder (block 420) as shown in Expression (15), and determining a feedforward filter and a feedback filter (block 425) as shown in Expressions (16) and (17), respectively.

The transmitting device may transmit to the users (block 430). Transmitting to the users may include ordering users (block 435). The transmitting device may order the users according to transmit power, transmit power allocation, scheduling order, and the like. The transmitting device may prepare a transmission to the users (block 440). According to an example embodiment, preparing the transmission may include precoding information to be transmitted to the users with the precoder P (i.e., to generate v from Expression (20)) and then adjusting the precoded information with the feedforward filter F (i.e., to generate x from Expression (20)). The transmitting device may transmit the filtered precoded information to the users (block 445).

Figure 4B:
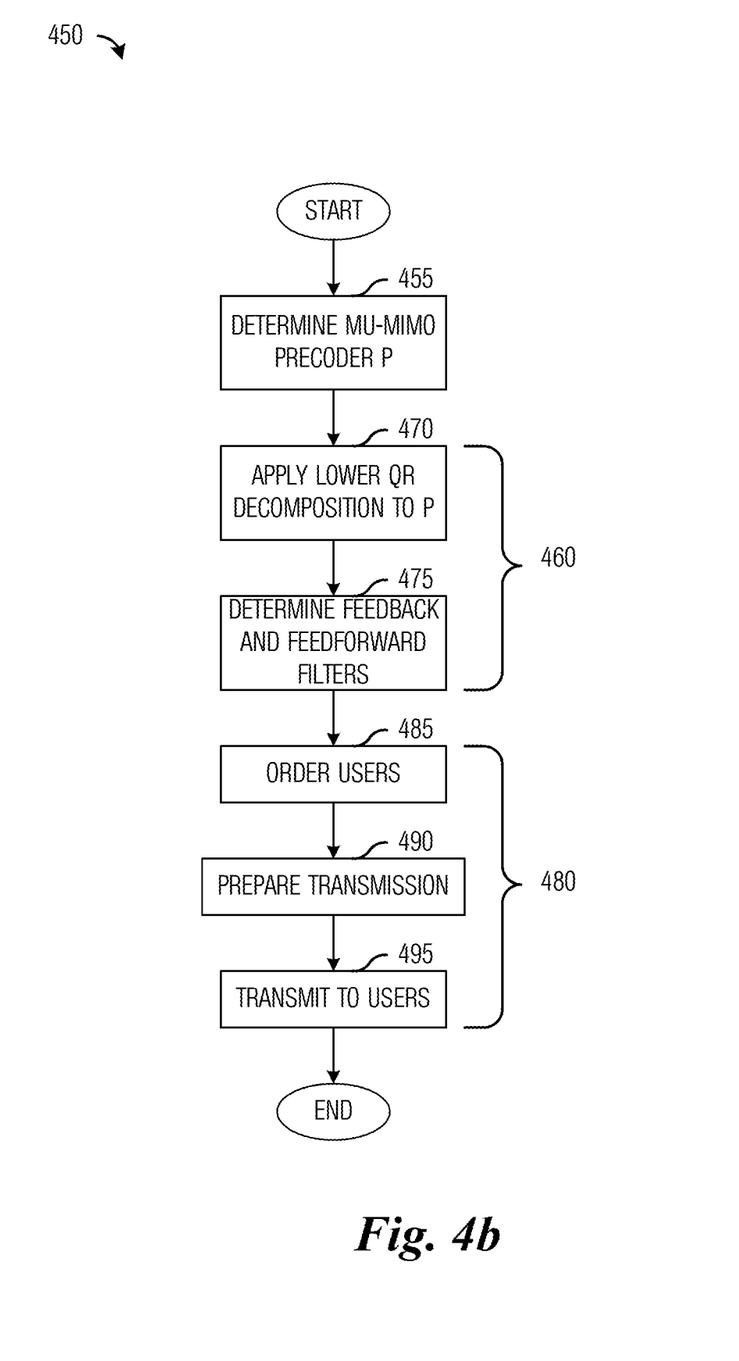
FIG. 4b illustrates an example flow diagram of operations in using DL MU-MIMO to transmit to a plurality of users utilizing a second example embodiment for determining coefficients for nonlinear operation, as well as a correlation matrix using a nonlinear precoding algorithm according to example embodiments described herein.

FIG. 4b illustrates a flow diagram of operations 450 in using DL MU-MIMO to transmit to a plurality of users utilizing a second example embodiment for determining coefficients for nonlinear operation, as well as a correlation matrix using a nonlinear precoding algorithm. Operations 400 may be indicative of operations occurring in a transmitting device, such as a base station, a user, and the like, as the transmitting device uses DL MU-MIMO to transmit to a plurality of users.

Operations 450 may begin with the transmitting device determining a MU-MIMO precoder (block 455). The precoder may be an arbitrary effective precoder. The transmitting device may determine coefficients for nonlinear operation, as well as a correlation matrix using the precoder (blocks 460). Determining the coefficients for nonlinear operation may include applying lower QR decomposition to the precoder (block 470). Applying lower QR decomposition to the precoder results in $$P = QR_1.$$

For notation purposes, let $R = R_1^{-H}$. The transmitting device may determine a feedforward filter and a feedback filter (block 475). The feedback filter and the feedforward filter may be expressed as:

$$B = R^H (\text{diag}(R))^{-1}$$

and $$F = Q(\text{diag}(R))^{-1}, \text{ respectively.}$$

It is noted that inverting $R_1$ is relatively simple since it is a triangular matrix.

The transmitting device may transmit to the users (block 480). Transmitting to the users may include ordering users (block 485). The transmitting device may order the users according to transmit power, scheduling order, and the like. The transmitting device may prepare a transmission to the users (block 490). According to an example embodiment, preparing the transmission may include precoding information to be transmitted to the users with the precoder P (i.e., to generate v from Expression (20)) and then adjusting the precoded information with the feedforward filter F (i.e., to generate x from Expression (20)). The transmitting device may transmit the filtered precoded information to the users (block 495).

Since the example embodiments are capable of operating on an arbitrary precoder, it may be possible to select a precoder that meets a desired performance goal. As an illustrative example, a ZF precoder P is selected with arbitrary power allocation, including a per layer power allocation for the users. The power allocation may be optimized to maximize a weighted sum rate of users. It is noted that weighted sum rate maximization is presented herein as an example of a performance goal and that other possible performance goals may be used. Another example of performance goals may include power-pooling restriction among groups of antennas at the transmitter. Therefore, the discussion of power allocation should not be construed as being limiting to either the spirit or scope of the example embodiments.

Let the ZF precoder P with arbitrary power allocation be expressed as:

$$P = H^H(HH^H)^{-1}D, \quad (21)$$

where $D_{K \times K}$ is a diagonal matrix with real diagonal entries $d_1, \ldots, d_K$. Then $$P^{-H} = P(P^H P)^{-1} \quad (22)$$
$$= H^H D^{-1}.$$

Let $Q_1$ and $R_1$ be the unitary and the upper triangular matrix obtained from QR decomposition of $P^{-H}$. Also, let Q and R be the unitary and the upper triangular matrix obtained from QR decomposition of $H^H$. Since D is diagonal, $Q_1 = Q$ and $$R_1 = RD^{-1}. \quad (23)$$

The transmit signal is expressible as $$x = Fv \quad (24)$$
$$= Q_1(\text{diag}(R_1))^{-1}v.$$

Therefore, the average transmit power is expressible as $$P_t = tr(E[xx^H]) \quad (25)$$
$$= tr(Q_1(\text{diag}(R_1))^{-2}Q_1^H)$$
$$= tr(Q_1^H Q_1(\text{diag}(R_1))^{-2})$$
$$= tr((\text{diag}(R_1))^{-2})$$
$$= tr(D^2(\text{diag}(R))^{-2})$$
$$= \sum_{k=1}^{K} a_k \delta_k,$$

where $\delta_k = d_k^2$ and $a_k = [R]_{kk}^{-2}$. The received SNR of user k is expressible as $$\rho_k = \frac{d_k^2}{N_k} \quad (26)$$
$$= \frac{\delta_k}{N_k},$$

where $N_k$ is the noise power at user k, $k=1, \ldots, K$. In the above SNR formula (Expression (26)), the modulo loss at the receivers has been ignored as it can be modeled as a constant reduction from received SNRs. The weighted sum-rate of users is expressible as $$r(\delta) = \sum_{k=1}^{K} w_k \log(1 + \rho_k) \quad (27)$$
$$= \sum_{k=1}^{K} w_k \log\left(1 + \frac{\delta_k}{N_k}\right),$$

where $w_k$ is the weight associated to user k, $k=1, \ldots, K$. The user weights may be provided by a MU-MIMO scheduler in a wireless network. As an illustrative example, in a proportional fair MU-MIMO scheduler, the weights are the inverse of average rate of users. The challenge may to maximize the objective function in Expression (27) subject to unit average transmit power (Expression (25)). In other words, $$\max_{\delta} r(\delta) = \sum_{k=1}^{K} w_k \log\left(1 + \frac{\delta_k}{N_k}\right) \quad (28)$$
$$\text{s.t. } \sum_{k=1}^{K} a_k \delta_k \leq 1.$$

The optimization problem (Expression (28)) is convex and may be solved using a dual decomposition technique. However, if a high SNR approximation of the Shannon rate, i.e., $\log(1+\text{SNR}) \approx \log(\text{SNR})$, the optimization problem may be simplified as $$\max_{\delta} \sum_{k=1}^{K} w_k \log(\delta_k) \quad (29)$$
$$\text{s.t. } \sum_{k=1}^{K} a_k \delta_k \leq 1$$

for which a closed-form solution is obtained by applying K.K.T. conditions. The optimal solution for the optimization problem shown in Expression (29) is expressible as $$d_k = [R]_{kk} \sqrt{\frac{w_k}{\sum_j w_j}}. \quad (30)$$

Therefore, an effective linear precoder with the above optimal power allocation may be expressed as $$P = H^H(HH^H)^{-1} \text{diag}(R)W, \quad (31)$$

where W is a diagonal matrix with diagonal entries $$\sqrt{\frac{w_k}{\sum_j w_j}}, k = 1, \ldots, K.$$

It may be insightful to compare the effective linear precoder with optimal power allocation (Expression (31)) with effective linear precoder of standard ZF-THP (Expression (11)). For the special case that all weights are equal, i.e., $w_1 = \ldots = w_K$, the two effective precoders are the same, which means that standard THP is optimal in terms of maximizing sum rate.

Figure 5:
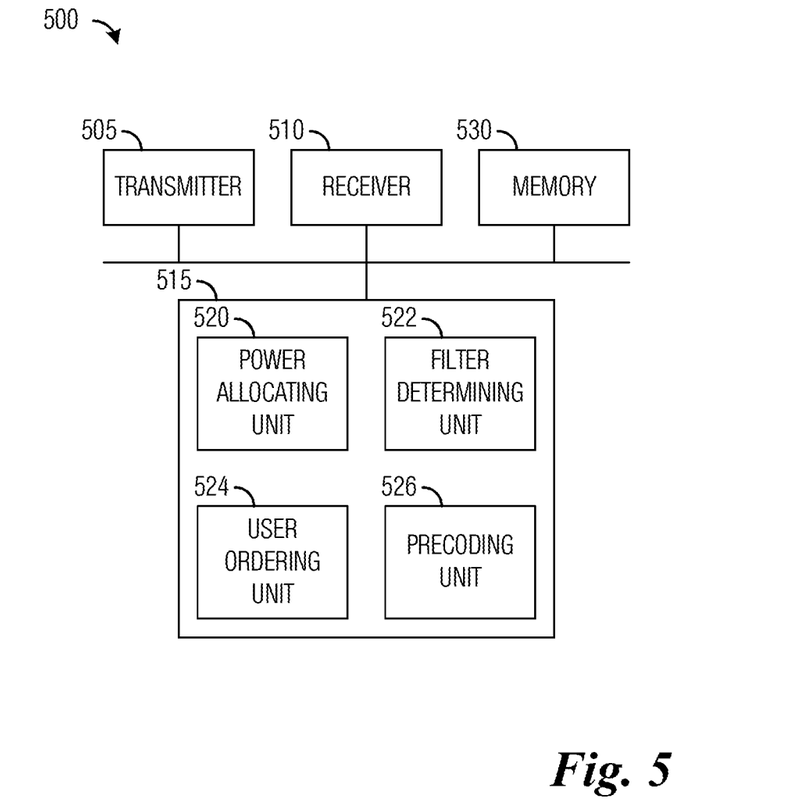
FIG. 5 illustrates an example communications device according to example embodiments described herein.

FIG. 5 illustrates a communications device 500. Communications device 500 may be an implementation of a transmitting device, such as a base station, an access point, an NodeB, an evolved NodeB, and the like. Communications device 500 may be used to implement various ones of the embodiments discussed herein. As shown in FIG. 5, a transmitter 505 is configured to transmit packets, scheduling grants, and the like. Communications device 500 also includes a receiver 510 that is configured to receive packets, and the like.

A power allocating unit 520 is configured to allocate power levels for users. As an example, power allocating unit 520 allocates power levels of transmissions to users. A filter determining unit 522 is configured to determine filters, such as a feedforward filter and/or a feedback filter, for use in adjusting precoded transmissions. Filter determining unit 522 is configured to make use of the techniques as described herein, such as a nonlinear precoder technique with an arbitrary precoder, to determine the filters. A user ordering unit 524 is configured to order uses. User ordering unit 524 orders users in accordance to their allocated power levels, scheduling order, and the like. A precoding unit 526 is configured to precode transmissions to users with a precoder. A memory 530 is configured to store filter(s), precoder(s), user(s), transmission(s), and the like.

The elements of communications device 500 may be implemented as specific hardware logic blocks. In an alternative, the elements of communications device 500 may be implemented as software executing in a processor, controller, application specific integrated circuit, or so on. In yet another alternative, the elements of communications device 500 may be implemented as a combination of software and/or hardware.

As an example, receiver 510 and transmitter 505 may be implemented as a specific hardware block, while power allocating unit 520, filter determining unit 522, user ordering unit 524, and precoding unit 526 may be software modules executing in a microprocessor (such as processor 515) or a custom circuit or a custom compiled logic array of a field programmable logic array. Power allocating unit 520, filter determining unit 522, user ordering unit 524, and precoding unit 526 may be modules stored in memory 530.

Figure 6:
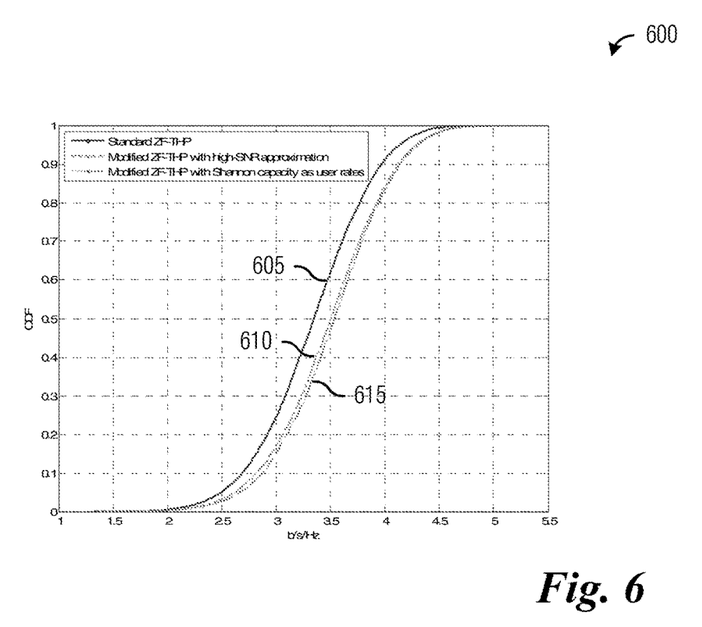
FIG. 6 illustrates an example data plot of weighted sum rate versus cumulative distribution function according to example embodiments described herein.

FIG. 6 illustrates a data plot 600 of weighted sum rate versus cumulative distribution function. A first trace 605 represents ZF-THP performance, a second trace 610 represents the modified ZF-THP algorithm performance with high SNR approximation, and a third trace 615 represents the modified ZF-THP algorithm performance with Shannon capacity. It is shown that the modified ZF-THP algorithm (second trace 610 and third trace 615) increases the weighted sum rate by about 0.19 b/s/Hz on the average compared to ZF-THP (first trace 605).

Figure 7:
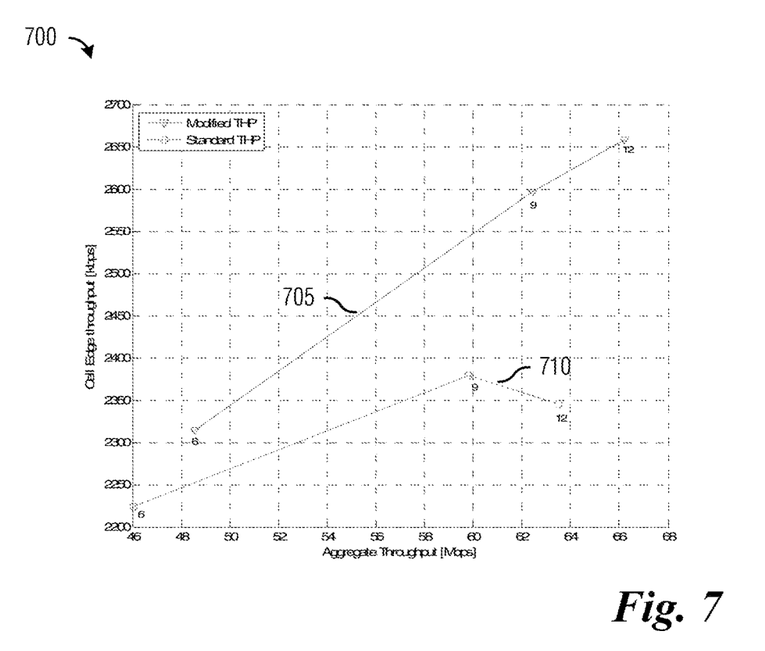
FIG. 7 illustrates an example data plot of total cell throughput versus cell edge average throughput for THP and the modified THP algorithm according to example embodiments described herein.

FIG. 7 illustrates a data plot 700 of total cell throughput versus cell edge average throughput for THP and the modified THP algorithm. A first trace 705 represents the modified THP algorithm performance, and a second trace 710 represents THP performance. The modified THP algorithm (first trace 705) offers both aggregate and cell-edge throughput gains over the THP (second trace). It is worth mentioning that these gains are obtained with little to no added complexity.

Although the present disclosure and its advantages have been described in detail, it should be understood that various changes, substitutions and alterations can be made herein without departing from the spirit and scope of the disclosure as defined by the appended claims.

What is claimed is:

1. A method for data transmission, the method comprising:
   selecting, by a transmitting device, a precoder, wherein the precoder is a linear precoder;
   deriving, by the transmitting device, a feedforward filter as a function of the precoder;
   preparing, by the transmitting device, transmission data in accordance with the precoder and the feedforward filter, wherein the preparing the transmission data comprises:
      precoding a first set of data in accordance with the precoder; and
      adjusting a second set of data using the feedforward filter without feedback,
         wherein the adjusting the second set of data comprises multiplying the second set of data with coefficients of the feedforward filter; and
   transmitting, by the transmitting device, the transmission data.

2. The method of claim 1, wherein deriving the feedforward filter comprises:
   deriving an inverse of a conjugate transpose of the precoder;
   decomposing the inverse of the conjugate transpose of the precoder to produce a first matrix and a second matrix; and
   determining the feedforward filter from the first matrix and the second matrix.

3. The method of claim 2, wherein decomposing the inverse of the conjugate transpose of the precoder comprises applying QR decomposition to the inverse of the conjugate transpose of the precoder.

4. The method of claim 2, wherein decomposing the inverse of the conjugate transpose of the precoder comprises applying lower QR decomposition to the inverse of the conjugate transpose of the precoder.

5. The method of claim 2, wherein the inverse of the conjugate transpose of the precoder comprises a pseudo-inverse of the conjugate transpose of the precoder.

6. The method of claim 1, wherein deriving the feedforward filter comprises:
   decomposing the precoder to produce a first matrix and a second matrix; and
   determining the feedforward filter from the first matrix and the second matrix.

7. The method of claim 1,
   further comprising deriving a feedback filter in accordance with the precoder; wherein
      the precoding the first set of data comprises adjusting the first set of data in accordance with the feedback filter to generate the second set of data, and
      the adjusting the second set of data further comprises adjusting the second set of data to generate the transmission data.

8. The method of claim 1, further comprising determining a per layer power allocation for a plurality of users.

9. The method of claim 8, wherein determining the per layer power allocation comprises optimizing a weighted sum rate of the plurality of users.

10. The method of claim 1, wherein the method further comprises ordering a plurality of users.

11. The method of claim 10, wherein the plurality of users are ordered in accordance to their power allocation.

12. The method of claim 10, wherein the plurality of users are ordered in accordance with a scheduling order of the plurality of users.

13. A method for transmitting data, the method comprising:
- selecting, by a transmitting device, a precoder having a per layer power allocation for a plurality of users, wherein the precoder is a linear precoder;
- deriving, by the transmitting device, a feedforward filter as a function of the precoder;
- adjusting, by the transmitting device, precoded transmissions to the plurality of users using the feedforward filter without feedback,
  - wherein the adjusting the precoded transmissions comprises multiplying the precoded transmissions with coefficients of the feedforward filter; and
- transmitting, by the transmitting device, the adjusted precoded transmissions.

14. The method of claim 13, wherein deriving the feedforward filter comprises:
- deriving an inverse of a conjugate transpose of the precoder;
- decomposing the inverse of the conjugate transpose of the precoder to produce a first matrix and a second matrix; and
- determining the feedforward filter from the first matrix and the second matrix.

15. The method of claim 13, wherein deriving the feedforward filter comprises:
- decomposing the precoder to produce a first matrix and a second matrix; and
- determining the feedforward filter from the first matrix and the second matrix.

16. The method of claim 13, further comprising ordering the plurality of users in accordance with the per layer power allocation.

17. The method of claim 13, further comprising:
- deriving a feedback filter such that the precoder is a matrix product of the coefficients of the feedforward filter multiplied by a third matrix, wherein the third matrix comprises an inverse of the feedback filter; and
- adjusting a first set of data in accordance with the feedback filter to generate the precoded transmissions.

18. A transmitting device comprising:
- a processor in the transmitting device configured to:
  - select a precoder;
  - derive a feedforward filter as a function of the precoder, wherein the precoder is a linear precoder; and
  - prepare transmission data in accordance with the precoder and the feedforward filter such that the processor is configured to:
    - precode a first set of data in accordance with the precoder; and
    - adjust a second set of data using the feedforward filter without feedback such that the processor is configured to multiply the second set of data with coefficients of the feedforward filter; and
- a transmitter operatively coupled to the processor, the transmitter configured to transmit the transmission data.

19. The transmitting device of claim 18, wherein the processor is configured to derive an inverse of a conjugate transpose of the precoder, to decompose the inverse of the conjugate transpose of the precoder to produce a first matrix and a second matrix, and to determine the feedforward filter from the first matrix and the second matrix.

20. The transmitting device of claim 19, wherein the processor is configured to apply QR decomposition to the inverse of the conjugate transpose of the precoder.

21. The transmitting device of claim 19, wherein the processor is configured to apply lower QR decomposition to the inverse of the conjugate transpose of the precoder.

22. The transmitting device of claim 18, wherein the processor is configured to:
- derive a feedback filter in accordance with the precoder using a nonlinear precoding algorithm;
- adjust the first set of data in accordance with the feedback filter to generate the second set of data; and
- adjust the second set of data using the feedforward filter without feedback to generate the transmission data.

23. The transmitting device of claim 18, wherein the transmitting device transmits to a plurality of users, and wherein the processor is configured to determine a per layer power allocation for the plurality of users.

24. The transmitting device of claim 18, wherein the transmitting device transmits to a plurality of users, and wherein the processor is configured to order the plurality of users.

25. The transmitting device of claim 19, wherein the processor is configured to:
- form a diagonal matrix comprising diagonal elements of the second matrix;
- invert the diagonal matrix; and
- multiply the inverted diagonal matrix with the first matrix to determine the feedforward filter.

* * * * *